United States Patent
Budd et al.

(10) Patent No.: US 7,290,034 B2
(45) Date of Patent: Oct. 30, 2007

(54) METHOD AND SYSTEM FOR POLLING A SERVER FOR NEW EMAILS, DOWNLOADING THE NEW EMAILS IN A BACKGROUND PROCESS, AND CACHING THE DOWNLOADED EMAILS FOR ACCESS BY AN EMAIL APPLICATION OF AN ELECTRONIC DEVICE, SUCH AS A PORTABLE COMPUTER

(75) Inventors: Robin Budd, Seattle, WA (US);
Christopher W. Jones, Seattle, WA (US)

(73) Assignee: Vulcan Portals Inc., Seattle, WA (US)

( * ) Notice: Subject to any disclaimer, the term of this patent is extended or adjusted under 35 U.S.C. 154(b) by 380 days.

(21) Appl. No.: 10/841,229

(22) Filed: May 7, 2004

(65) Prior Publication Data
US 2005/0076086 A1  Apr. 7, 2005

Related U.S. Application Data

(60) Provisional application No. 60/504,165, filed on Sep. 18, 2003.

(51) Int. Cl.
*G06F 13/00* (2006.01)
(52) U.S. Cl. .................................. 709/206
(58) Field of Classification Search ............ None
See application file for complete search history.

(56) References Cited

U.S. PATENT DOCUMENTS

| | | | |
|---|---|---|---|
| 5,841,431 A | 11/1998 | Simmers | |
| 6,457,879 B1 * | 10/2002 | Thurlow et al. | ............ 709/206 |
| 6,985,753 B2 | 1/2006 | Rodriguez et al. | |
| 7,016,704 B2 | 3/2006 | Pallakoff | |
| 7,176,961 B2 | 2/2007 | Shimamura | |
| 7,184,092 B2 | 2/2007 | Lim | |
| 7,194,514 B1 | 3/2007 | Yen et al. | |
| 2002/0016818 A1 | 2/2002 | Kirani et al. | ............... 709/203 |
| 2002/0059384 A1 | 5/2002 | Kaars | |
| 2002/0065849 A1 | 5/2002 | Ferguson et al. | ........... 707/513 |
| 2002/0178271 A1 | 11/2002 | Graham et al. | ............. 709/229 |
| 2005/0076085 A1 | 4/2005 | Budd et al. | |
| 2005/0076087 A1 | 4/2005 | Budd et al. | |

* cited by examiner

OTHER PUBLICATIONS

Skahan, "Sendmail+IDA," Linux Journal, 3:1-11, Jul. 1994, http://linux4u.jinr.ru/usoft/WWW/LJ/issue3/sendmail.html.

*Primary Examiner*—Robert B. Harrell
(74) *Attorney, Agent, or Firm*—Seed IP Law Group PLLC

(57) ABSTRACT

An electronic device, such as a hand-held portable computer, is provided with client-side email capability that allows emails to be independently downloaded from a server, regardless of an operating mode of an email application and without using the standard email retrieval mechanism of the email application. The emails are periodically downloaded without attachments in response to a poll of the server and if a sufficient high-speed connection to the server is available, and then the downloaded email is locally stored in a local cache of the portable computer. Attachments associated with downloaded emails stored in the local cache can be selectively downloaded, via a background process, from the server independently of the operating mode of the email application and during any suitable power state of the electronic device. Synchronization of attachments to emails in the local cache is also independently performed, thereby bypassing synchronization that is normally performed by the email application while in the online mode.

41 Claims, 8 Drawing Sheets

METHOD AND SYSTEM FOR POLLING A SERVER FOR NEW EMAILS, DOWNLOADING THE NEW EMAILS IN A BACKGROUND PROCESS, AND CACHING THE DOWNLOADED EMAILS FOR ACCESS BY AN EMAIL APPLICATION OF AN ELECTRONIC DEVICE, SUCH AS A PORTABLE COMPUTER

CROSS REFERENCE TO RELATED APPLICATION

The present application claims the benefit under 35 U.S.C. § 119(e) of U.S. Provisional Patent Application Ser. No. 60/504,165, entitled "SOFTWARE AND HARDWARE FEATURES FOR MINI-PC," filed Sep. 18, 2003, assigned to the same assignee as the present application and which is incorporated by reference in its entirety.

TECHNICAL FIELD

The present disclosure relates generally to electronic devices, and in particular but not exclusively, relates to client-side polling and caching of electronic mail ("email") in a manner that is optimized for an electronic device, such as a hand-held portable computer, operating in a limited-bandwidth and/or high-latency networking environment.

BACKGROUND INFORMATION

Today's computer users are highly mobile individuals. Whether on business trips, on vacations, or coming to and from work, these individuals are readily identifiable by their use of laptops, enhanced-functionality cellular telephones, Palm Pilots™, Blackberries™, and other portable electronic devices. Indeed, many establishments provide Internet connections that cater to individuals who may be merely passing through the establishment for a short period of time. For instance, Internet connections are available at airports and hotels, and even in restaurants and coffee shops. Often times, these individuals take advantage of these transitory Internet connections to send and view emails.

Because of the portable nature of the electronic devices, there are certain limits to their capabilities. For instance, portable electronic devices generally have less processing power and have relatively primitive display screen capabilities as compared to their desktop counterparts. Wireless connection issues also affect the use of portable electronic devices. For example, there may not be a wireless connection available in some locations, and even if a wireless connection is available, use of that wireless connection can be costly in terms of amount of online time and/or amount of bandwidth utilized to send and receive data. These costs become much more severe if the only available wireless connection is one having low bandwidth and/or high latency.

Email provides a clear illustration of the limitations of portable electronic devices. A typical individual can receive anywhere from a dozen to 100 emails per day. The total email volume can be as much as 12 MB of data, for instance. Moreover, one fourth of emails may have attachments, where 90% of email data may comprise attachments. Email may be received at any time, but is generally received between the hours of 8:00 AM to 6:00 PM.

For a mobile individual with a portable electronic device, that individual might check his email every two hours. Generally, the individual uses an email application in the portable electronic device in an "offline" mode when a connection to a network is not present. In the offline mode, the email application accesses and manipulates email stored in a local cache, as opposed to retrieving and processing email from a remote server when in an "online" mode. When the email application is in the offline mode, the individual can read copies of previously received or sent emails that are locally cached, and can compose emails to send. Meanwhile, real-time (new) email is being received at the remote server, but is not being forwarded to or retrieved by the unconnected portable electronic device.

When the connection to a network is established, the email application can transition to the online mode. In the online mode, the new email that is remotely stored in the server is downloaded to the portable electronic device (and appears in an inbox) and email that the individual has composed while offline can finally be sent from the portable electronic device. The downloading of the new email to the portable electronic device is part of a synchronization process in some email applications, where email records in the local cache on the portable electronic device are updated to be consistent with email records at the remote server (or vice versa).

As most email users are aware, offline modes are clumsy and inconvenient. When the online mode is entered, synchronization is also clumsy and time consuming. For instance, given the high number of emails and large attachments that may potentially need to be downloaded from the remote server during synchronization in the online mode, the synchronization process can take an inordinate amount of time to complete, especially if the only available connection to the remote server is a low-bandwidth and/or high-latency wireless connection. Moreover, when the downloading occurs during synchronization, the email application attempts to download all of the new emails from the remote server (e.g., download "all or nothing")—once the download process starts, the individual has to wait until the process finishes, which again, can be extremely time consuming and annoying to the individual if there are large attachments to download and if the individual is in a rush. If the download fails anytime during the process, then the entire download has to be performed again from the beginning.

This downloading further highlights other shortcomings of current implementations of portable electronic devices. In order to properly cater to the highly mobile individual, portable electronic devices should allow that individual to receive email anytime and anywhere. However, having the capability to download and read email only when logged in at docking stations at an airport or at a coffee shop is not consistent with the habits and needs of the mobile individual. Wireless networks attempt to address this issue by providing wireless connectivity in a greater number of areas, but the high volume of email and the large size of attachments to download can make wireless connectivity expensive and inconvenient as described above.

There are implementations that "strip" attachments at the remote server or at some network location behind a corporate firewall. This attachment stripping does reduce the amount of data that is to be received by the electronic device, and therefore might provide some improvements in performance. However, such attachment-stripping implementations typically require installation and maintenance of specialized software components at the remote email server and/or at the network location behind the firewall. Information technology departments are notorious for their reluctance to install and maintain such additional components in their existing systems, due to factors such as expense, labor for installation and maintenance, compatibility and/or reliability issues, and so forth.

While the above problems have been explained in the context of portable electronic devices, these problems may be encountered with desktop computers or other stationary electronic devices as well. That is, wherever there is a low-bandwidth and/or high-latency networking environment, email applications of such stationary electronic devices will experience downloading and synchronization limitations and difficulties.

BRIEF SUMMARY OF THE INVENTION

In one preferred aspect, a method usable for an electronic device having an email application comprises determining at time intervals if at least one connection to a server is present, and if at least one connection is determined to be present, the method includes polling the server to determine if new email is available for download. At least one new email is downloaded to the portable electronic device via the at least one connection, if present, without using at least a portion of a default email retrieval mechanism of the email application. The downloaded portion of the email is locally stored.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
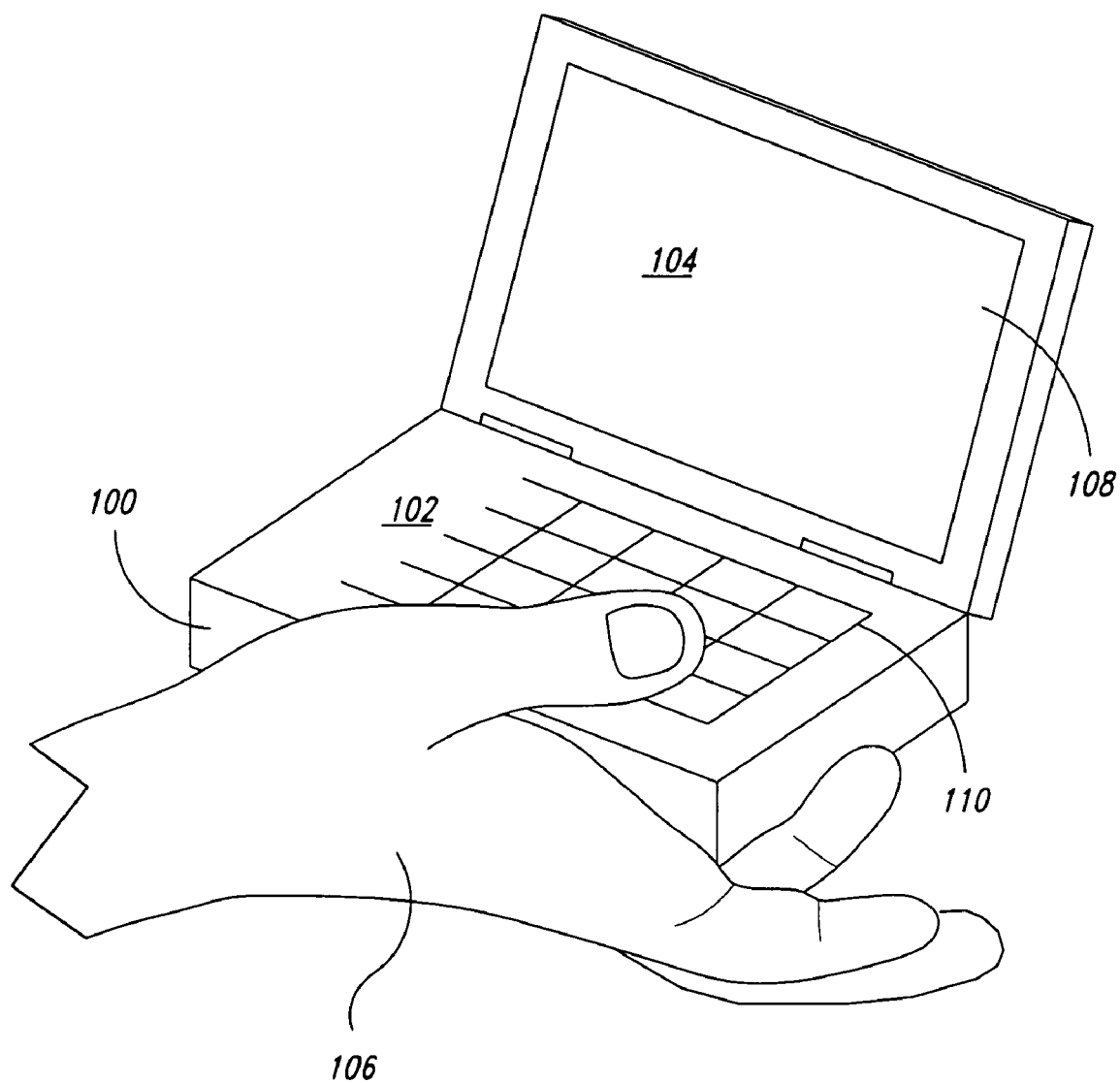
FIG. 1 is a front, top right isometric view of an example hand-held portable computer including a lid in an open position.

Embodiments of client-side email applications for a hand-held portable computer or other types of electronic devices are described herein. In the following description, numerous specific details are given to provide a thorough understanding of embodiments. The invention can be practiced without one or more of the specific details described herein, or with other methods, components, materials, etc. In other instances, structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment provides a client-side email application for an electronic device. A non-limiting example of such an electronic device is a portable electronic device having a small form factor. The electronic device, according to an embodiment, comprises a hand-held portable computer having at least one display screen and a keyboard. Because of the small size of the portable computer and the email features provided therein, the portable computer is suited for the highly mobile individual who wishes to receive email anytime and anywhere, without necessarily having to be connected by a dock to a high-speed communication connection on a physical hardwire network. Nevertheless, embodiments can be implemented for other types of electronic devices, such as full-size stationary desktop computers, that have the capability to operate in a low-bandwidth and/or high-latency networking environment.

Therefore, the invention is not to be limited to a particular type or size of electronic device. For purposes of simplicity, a portable computer will be used throughout this description to explain the operation of various embodiments.

According to an embodiment, the portable computer is provided with email functionality where email or a portion thereof can be downloaded from a server without attachments and/or without some other portion of emails (such as large email bodies or embedded content). The downloading of emails without attachments can be performed without having to install specialized software components on any device other than the portable computer running the client-side email application. Further, downloading can occur independent of the operating mode of an email application or power state of the portable computer (e.g., the portable computer may be in a standby state and then wakes up to download email).

The downloading is performed in one embodiment when the email application is in the offline mode or is not running, using a background poll and cache technique where an email service component on the portable computer is "awakened" during the polling interval and downloads new email (without attachments or other content excluded) from the server if a wireless connection to the server is available. During the background polling and caching, the email application is kept in the offline mode or is not running so as to prevent its default transport provider from retrieving email from the server, thereby allowing the email service component to retrieve email from the server. The downloaded email is stored in local storage (such as an offline cache or other memory) accessible by the email application, such that the user can continuously read email ("anytime and anywhere") that has been periodically and previously downloaded, rather than having to connect online and wait for all new emails to be downloaded at once during a synchronization cycle. In another embodiment, such as for email applications that operate only in an online mode, the email service component performs the background polling of the server and the caching, but the email application communicates with the email service component instead of the server.

In one illustrative example embodiment, the email application may not be running (or may be offline) as a user carries the portable computer from the user's car to an office building. Even though the email application is not running (or is offline), the email service component is regularly monitoring for a suitable network connection. If the email service component locates a suitable network connection in the office building (such as a wireless connection), then that connection is opportunistically used to connect to the server, poll the server for new email, and then download emails (without attachments) into the local cache. By the time the user actively operates the portable computer while in the office building or at some other subsequent location, the user will see new email (or indications thereof in an inbox that can be accessed while the email application is in the offline or online mode (e.g., the user need not place the email application in the online mode and then wait for the email application to download email).

If the user wishes to view a particular attachment of an email that is stored in the local cache, an embodiment provides a user interface through which the user can select specific attachments to download while the email application remains in the offline mode. The attachment is downloaded in a background process, such that the user can continue to concurrently use other applications while the download is being performed and does not have to wait for the download to complete.

An embodiment further provides a synchronization process that is performed in the offline mode and/or while the email application is in some other state (e.g., not running), and that bypasses or overrides the synchronization process performed by the email application while in the online mode. The synchronization process performed in the offline mode (or while the email application is not running) downloads attachments if a high-speed or other connection to the server is available, thereby preventing duplication of email copies in the inbox or inadvertent deletion of email attachments from the server during a subsequent standard synchronization process in the online mode.

Figure 2:
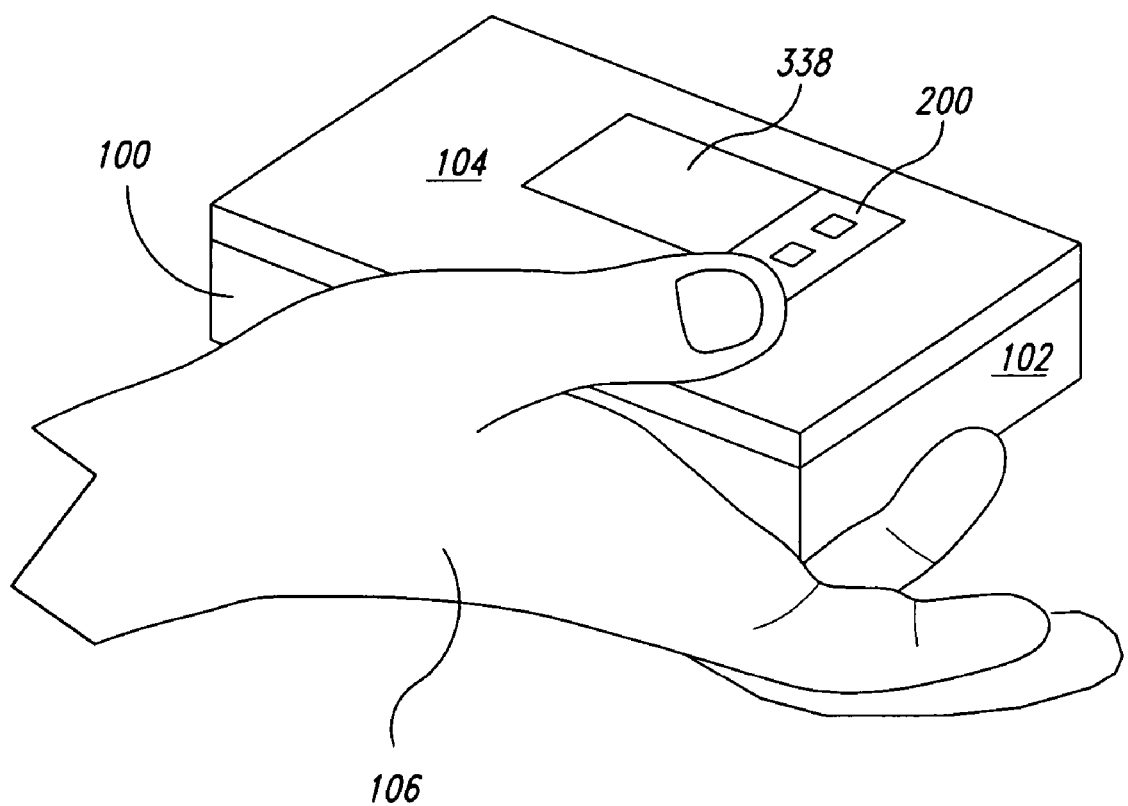
FIG. 2 is a front, top right isometric view of the example hand-held portable computer including the lid in a closed position.

FIGS. 1-2 show an example portable electronic device, in this case a hand-held portable computer 100 in which an embodiment may be implemented. While the portable computer 100 is used as the illustrative example throughout this application, other embodiments may be implemented with devices that may not necessarily be thought of as a "computer" by the average individual or with devices that may not necessarily have the same portability feature, shape, and/or appearance as the portable computer 100 of FIGS. 1-2. Examples include wireless communication devices, display devices, monitors, stationary desktop computers, audio-video equipment, consumer electronic devices, or other electronic devices that may or may not have a reduced form factor and which can have email issues (e.g., resulting from low bandwidth and/or high latency network conditions) that are addressable by the principles described herein.

As shown, the portable computer 100 is similar in appearance to a laptop computer, in that it comprises first and second portions 102 and 104, respectively. The first portion 102 can include a keyboard 110 and housing for the internal electronic components (such as one or more processors, machine-readable storage media, graphics drivers, and so forth). The second portion 104 operates as a lid that folds over the first portion 102 (when in a closed position, such as shown in FIG. 2), and includes a display screen 108 for displaying information (such as an email inbox, emails, downloaded attachments, and the like and/or indicators that indicate the presence emails, attachments, etc. in an inbox or email folder) while the second portion 104 is unfolded to an upright position as shown in FIG. 1.

Unlike a conventional laptop computer, however, an embodiment of the portable computer 100 is substantially smaller in size in terms of both volume and weight. An example dimensional size of the portable computer 100 is 140 mm long, 101 mm wide, and 30 mm thick (while closed), with a weight of approximately one pound. The display screen 108 on the second portion 104 is of a resolution comparable to a desktop computer monitor. In general, the size of the display screen 108, the size of the internal components (e.g., chips and circuit boards) located within the first portion 102, and the strategic placement of the internal components (e.g., density), and other factors will influence the overall form factor of the portable computer 100. As illustrated in FIGS. 1-2, the portable computer 100 has a size such that it can be held securely in a hand 106 of a user whether in the open or closed position.

FIG. 2 further illustrates an embodiment of the portable computer 100 that has a rear display 338 positioned on the top surface (lid) of the second portion 104. As described later below, the rear display 338 can form part of a rear display module for displaying attachment listings or an email inbox, and which provides controls 200 to select an email to read, select an attachment to download, or to perform other operations.

Examples of the portable computer 100 in which embodiments of the email solutions may be implemented are disclosed in U.S. patent application Ser. No. 10/338,802, entitled "SYSTEM AND METHOD FOR HEAT REMOVAL FROM A HAND-HELD PORTABLE COMPUTER WHILE DOCKED"; U.S. patent application Ser. No. 10/338,815, entitled "NAVIGATION AND SELECTION CONTROL FOR A HAND-HELD PORTABLE COMPUTER"; U.S. patent application Ser. No. 10/338,761, entitled "HEAT DISSIPATION FROM A HAND-HELD PORTABLE COMPUTER"; and U.S. patent application Ser. No. 10/338,791, entitled "KEYBOARD WITH MOUSE FOR A HAND-HELD PORTABLE COMPUTER", all filed Jan. 7, 2003, assigned to the same assignee as the present application, and all of which are incorporated herein by reference in their entireties.

Figure 3:
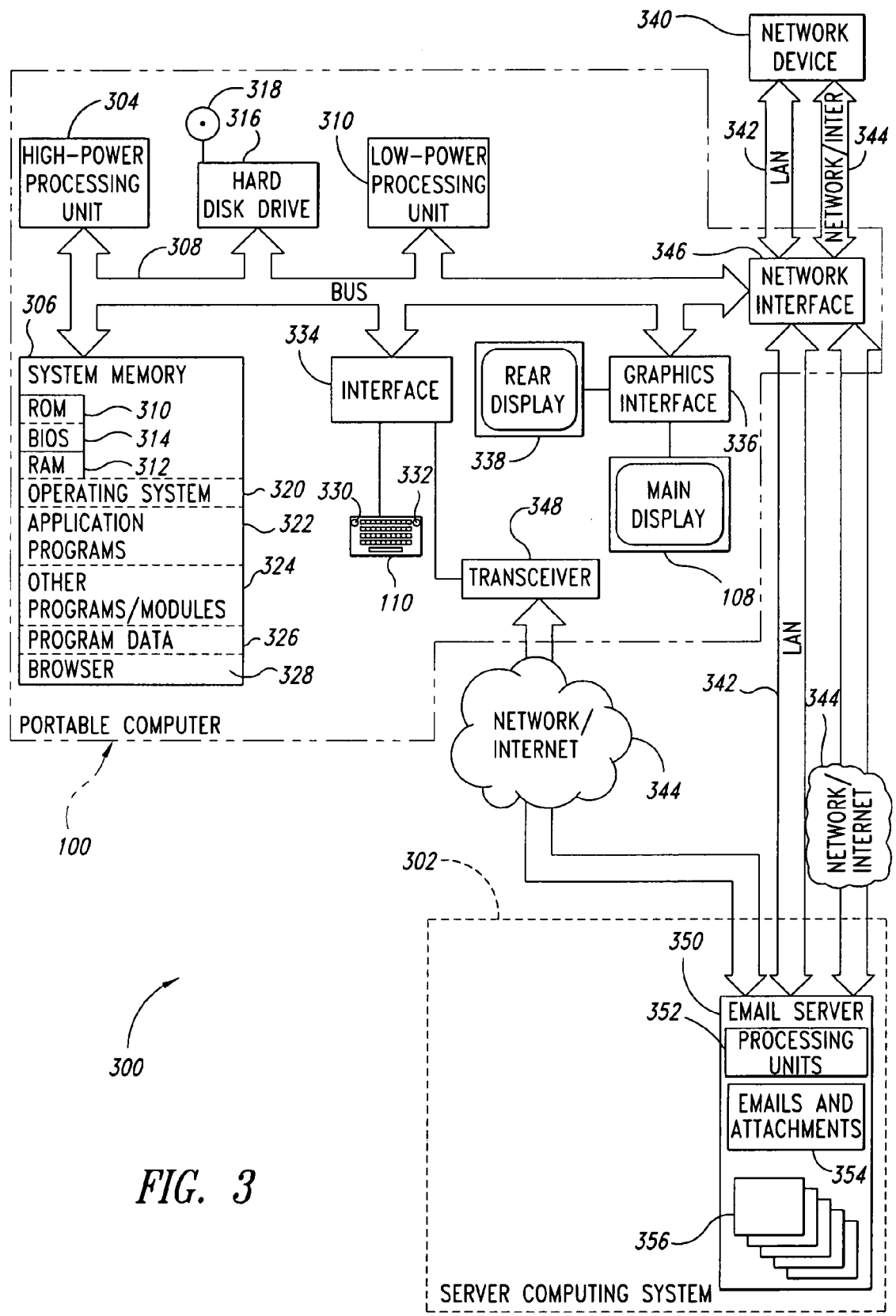
FIG. 3 is a block diagram of an embodiment of the portable computer in more detail and a network environment in which the portable computer may be used.

FIG. 3 and the accompanying discussion provide a description of a suitable computing environment in which embodiments can be implemented. Although not required, embodiments will be described in the general context of hardware and computer-executable instructions, such as program application modules, objects, or macros that are capable of being executed by a computer (such as by the portable computer 100). These embodiments can be practiced with other computer system configurations, including other types of hand-held portable devices.

FIG. 3 shows a computing system 300, and in particular shows an embodiment of the portable computer 100 in more detail and a network environment in which the portable computer 100 may be used. The computing system 300 includes the portable computer 100 and a server computing system 302. The server computing system 302 may be located at one or more network locations, for example, at one or more Internet Service Provider (ISP) locations to store and serve email information for the portable computer 100 and other email clients.

The portable computer 100 includes a high-power processing unit 304, a system memory 306, and a system bus 308 that couples various system components including the system memory 306 to the high power processing unit 304.

The high-power processing unit 304 may be any logic processing unit, such as one or more central processing units (CPUs), digital signal processors (DSPs), application-specific integrated circuits (ASICs), etc. In an embodiment, the portable computer 100 may also include a low-power processing unit 310, which may or may not necessarily operate with the same operating system as the high-power processing unit 304.

The system bus 308 can employ any suitable bus structure or architecture, including a memory bus with memory controller, a peripheral bus, and a local bus. The system memory 306 includes read-only memory (ROM) 310 and random access memory (RAM) 312. A basic input/output system (BIOS) 314, which can form part of the ROM 310, contains routines that help transfer information between elements within the portable computer 100, such as during start-up.

The portable computer 100 may include a hard disk drive 316 for reading from and writing to a hard disk 318. The hard disk drive 316 communicates with the high-power processing unit 304 via the system bus 308. The hard disk drive 316 may include interfaces or controllers (not shown) coupled between such drive(s) and the bus 308. The hard disk drive 316 and its associated hard disk 318 provide nonvolatile storage of computer readable instructions, data structures, program modules and other data for the client computing system 12. Although the depicted portable computer 100 employs the hard disk drive 316 and the hard disk 318, other types of drives and computer-readable media that are capable of storing data accessible by a computer may be employed, such as compact disks (CDs), magnetic cassettes, flash memory cards, digital video disks (DVDs), Bernoulli cartridges, RAMs, ROMs, smart cards, etc. In one embodiment, the hard disk drive 316 and/or other drives are not integrated within a housing of the portable computer 100 itself, but instead are external devices that are accessible via hardwire or wireless communication interfaces.

Program modules can be stored in the system memory 306, such as an operating system 320, one or more application programs 322 (such as an email program), other programs or modules 324, and program data 326. An example operating system 320 that may be used is Windows XP™ commercially available from Microsoft Corporation of Redmond, Wash. The program data 326 can be stored as a data structure, file, or other data format in a cache, database, or other storage unit integrated in or separate from the system memory 306. Further detailed discussion of the application program 322 (and more specifically an email application program), other programs/modules 324 for use with email, and the program data 326 (such as an offline profile, email data, and related email configuration information) will be provided later below.

The portable computer 100 may also include a web browser 328 for permitting the portable computer 100 to access and exchange data with sources such as Internet web sites, corporate intranets, or other networks as described below, as well as other server applications on server computers. The browser 328 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as NETSCAPE NAVIGATOR® from America Online, and INTERNET EXPLORER® available from Microsoft Corporation of Redmond, Wash. While shown in FIG. 3 as being stored in the system memory 306, the operating system 320, application programs 322, other programs/modules 324, program data 326, and browser 328 can be stored in the hard disk 318 of the hard disk drive 316 and/or other computer-readable media.

A user can enter commands and information into the portable computer 100 through input devices (such as the keyboard 110) and a pointing device (such as a mouse 330 built into the keyboard 110, an example of which is disclosed in U.S. patent application Ser. No. 10/338,791). Alternatively or additionally, the mouse 330 can be embodied as a touch pad as compared to physical buttons. Another input device may take the form of one or more buttons 332 on the side of the keyboard 110, with the button(s) 332 usable for scrolling and clicking via turning and pressing of the button(s) 332. Other possible input devices can include a microphone, joystick, game pad, scanner, etc. (not shown). These and other input devices are connected to the high-power processing unit 304 through an interface 334 such as a serial port interface that couples to the bus 308, although other interfaces such as a parallel port, a game port or a wireless interface or a universal serial bus (USB) can be used. The interface 334 can be any suitable communication interface to the bus 308 and need not necessarily be a port per se. In one embodiment, the input devices such as a mouse, joystick, game pad, keyboard, etc. are integrated directly into the housing of the portable computer 100, rather than or in addition to being coupleable via a serial or parallel port interface.

The display screen 108 operates as the main display and is coupled to the bus 308 via a graphics interface 336, such as a video adapter or other graphics component that will allow video and other graphics to be rendered on the display screen 108. The rear display 338 may also be present in one embodiment to allow emails to be displayed on the top lid (i.e., on the outside surface of the second portion 104 of the portable computer 100), when the lid is closed on the portable computer 100.

The portable computer 100 can operate in a networked environment using logical connections to one or more networked computers and/or devices, such as the server computing system 302 and a network device 340, such as a printer or network storage unit. The portable computer 100 is logically connected to one or more networked computing systems or devices under any suitable method of permitting computers to communicate, such as through a wireless local area network (LAN) 342, a wireless wide area network (WWAN), or any other network 344, including wired and wireless networks that use or can communicate with the Internet (e.g., World Wide Web). Other embodiments include other types of communication networks including telecommunications networks, cellular networks, paging networks, and other mobile networks. Examples of wireless systems and protocols with which the portable computer 100 can communicate, include but are not limited to, Wi-Fi, Bluetooth, 802.11, and others.

When used in a LAN networking environment, the portable computer 100 can be connected to the LAN 342 through an adapter or network interface 346 (communicatively linked to the bus 308). When used in a WWAN or other network 344, the portable computer 100 may include a modem, transceiver 348 or other device, such as the network interface 346, for establishing communications over this networking environment. The transceiver 348 as shown in FIG. 3 is communicatively linked between the interface 334 and the network 344, for communicating between the portable computer 100 and the server computing system 302, for instance. In a networked environment, emails and related data, or portions thereof, can be stored on or passed through the server computing system 302, and downloaded to the portable computer 100. The transceiver 348 may be one or more transmitters, receivers, or other communication devices that are compliant with, for example, 802.11, GPS, Bluetooth, cellular (TDMA, FDMA, and/or CDMA), Wi-Fi, virtual private network (VPN), and/or other communication standard or technique.

In one embodiment, the portable computer 100 is communicatively linked to the server computing system 302 through the LAN 342 and/or the network 344 with transmission control protocol/Internet protocol (TCP/IP) middle layer network protocols or other network protocol layers, such as User Datagram Protocol (UDP). The network connections shown in FIG. 3 are only some examples of establishing communication links between computers, and other links can be used, including both hardwire and wireless links.

The server computing system 302 (which can comprise a hardware computing system, software computing system, or combination of both) includes one or more servers 350. For purposes of understanding operation of an embodiment, the server 350 will be described herein in the context of an email server. An example of such a server is a Microsoft Exchange™ server, and the principles described herein are not to be limited to only email implementations that use a Microsoft Exchange™ server. For example, embodiments are applicable to POP3, IMAP, or other types of servers (as well as different types of email clients/applications alternatively or additionally to Microsoft Outlook 2003™) that operate to supply files or services. A server can comprise hardware, software, firmware, or combinations thereof that provide such files and services, including for example, a single hardware server that runs multiple server software.

In one illustrative embodiment, the server 350 can be a remote server in that the server 350 is not physically located within, or is otherwise externally located from, the portable computer 100. For purposes of illustration and explanation herein, the server 350 of an embodiment will generally be described herein in the context of being accessible via the network 344.

The server 350 can include one or more processing units 352, which can comprise CPUs, controllers, processors, and the like, that work in conjunction with server applications for the routing of emails and related data between the portable computer 100 (and other clients) and the server computing system 302. The server 350 stores emails and attachments (if any) 354 that are to be sent to and from the portable computer 100. In an embodiment that will be described below, the portable computer 100 regularly polls the server 350 for new emails 354, and downloads at least a portion of these emails from the server 350 without the associated attachments. The portable computer 100 also receives email data 356 (such as email and attachment properties) that is indicative of the size of an attachment, its file type, and other data related to an email and its associated attachment. In this manner, and as will be described below, the user can be presented with information regarding the attachments that have not been downloaded and then make a determination as to which attachment(s) to selectively download.

Figure 4:
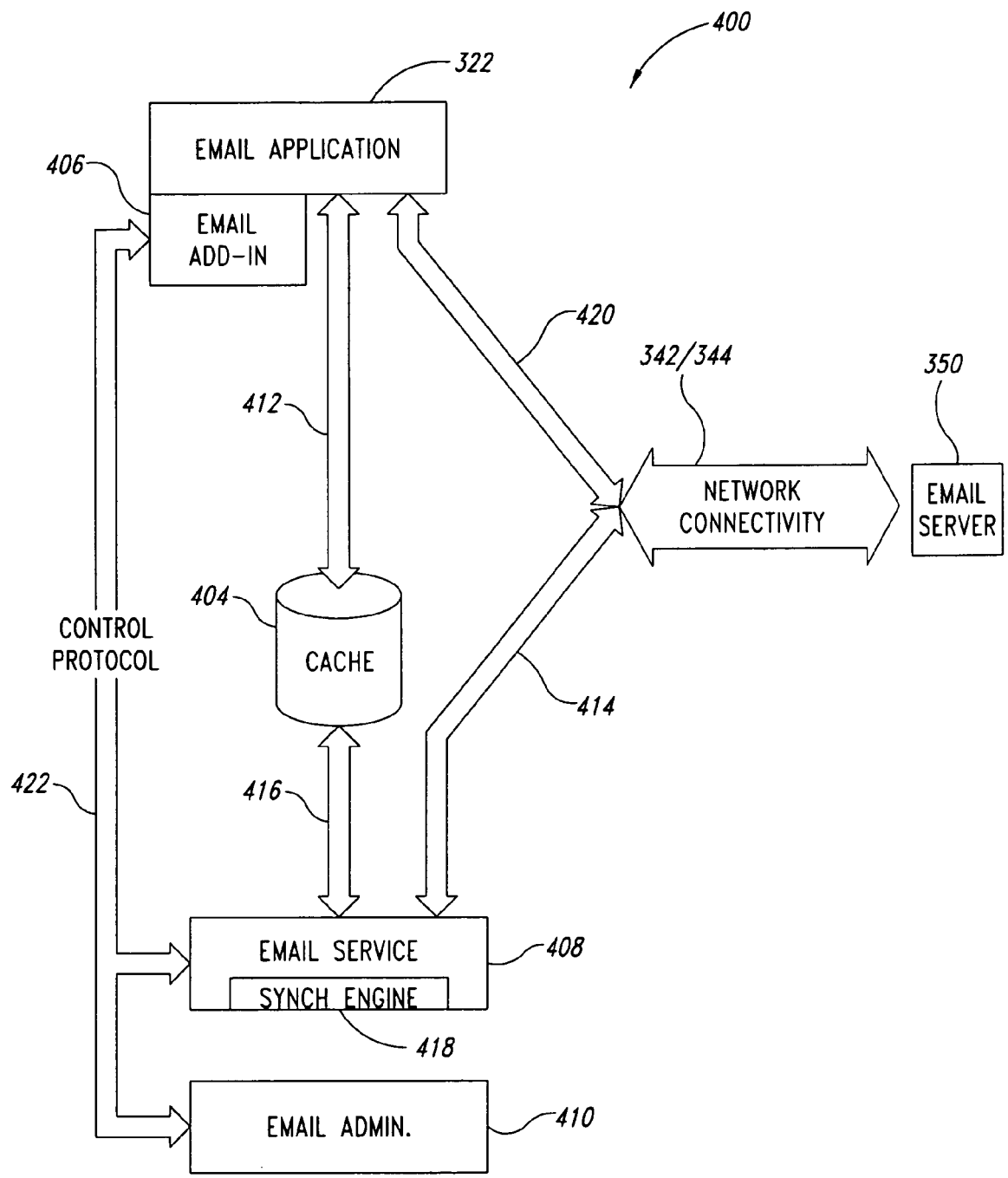
FIG. 4 is a block diagram showing email components of the portable computer in accordance with one embodiment.

FIG. 4 is a block diagram 400 showing email components of the portable computer 100 in accordance with an embodiment. One of the applications 322 of FIG. 3 is depicted specifically in FIG. 4 as an email application 322. In an embodiment, the email application 322 is Microsoft Outlook 2003™, and will be described hereinafter in that specific context where appropriate. However, the principles described herein may be applied to other types of email applications, and that the invention is not restricted solely to Microsoft Outlook 2003™ and can be applied to Lotus NoteS™, Eudora™, and so forth.

The email application 322 of one embodiment is a commercially available email application that does not need to have its basic source code specifically modified in order to provide the various inventive features described herein-rather, the email application 322 includes a standard framework to allow third-party code or software to run during the email application's 322 execution process. For example, Microsoft Outlook 2003™ has a framework to allow such third-party software to run as dynamic link library (DLL) functions during operation of the email application 322. Thus, certain email functions provided by an embodiment (such as downloading emails without attachments, selective download of attachments, synchronization, and others) are DLL functions that Microsoft Outlook 2003™ can call during execution.

A messaging service (or other software module, program, subroutine, or other code) is integrated with or otherwise works in conjunction with the email application 322 to manage the sending and receiving of email. In the context of Microsoft Outlook 2003™, the messaging service includes a messaging application program interface (MAPI) transport provider and a message store service. Among other functions, the MAPI transport provider receives instructions from the email application 322 to obtain new email from the server 350.

The email application 322 of an embodiment can operate in one or more operating modes. Examples of such operating modes include, but are not limited to, an online mode, offline mode, inoperative mode (e.g., the email application is not launched but the portable computer 100 itself may be running), or other operating mode. Email applications from different manufacturers can have differences in modes that are available, and in the capabilities and performance of the email applications while in certain operating modes.

According to an embodiment, the high power processing unit 304 can control operation of the email application 322, including setting the email application 322 in the appropriate operating mode (such as the offline mode, for example) and for maintaining the email application 322 in that operating mode, which substantially prevents the mail retrieval mechanism of the email application 322 from retrieving email from the server 350. The high power processing unit 304 can be further provided for controlling the email application 322 to access local memory, such as the system memory 306, for downloaded emails while in the offline mode or other memory-access mode, for example, alternatively to accessing or retrieving the email from the server 350 (i.e., as with an online mode or other server-access operating mode of the email application 322).

If in an "online" mode, the MAPI transport provider communicates this request to the message store service, which then directly downloads the new email from the server 350 and provides the downloaded email to the email application 322, as symbolically depicted by an arrow 420 in FIG. 4. The downloaded email is stored in a local cache 404 (or other memory that is located in the portable computer 100 and that is used for storing email or portions thereof, such as the system memory 306), and the email application 322 accesses and processes emails from the local cache 404 during the online mode, as symbolically depicted by an arrow 412. With some other email applications 322, there are no locally cached emails. Rather, the email application 322 directly accesses and processes emails from the server 350 while an online connection is present, and has limited or no operation when there is no online connection.

During an "offline mode" or more specifically a Cached Exchange Mode (CEM) in Microsoft Outlook 2003™, the email application 322 operates in conjunction with the local cache 404 and does not directly retrieve email from the server 350 (e.g., the transport provider of the email application 322 is not invoked). With Microsoft Outlook 2003™, the local cache 404 stores an .ost file that includes folders having mirror copies of emails (e.g., the user's online mailbox) that are present at the server 350. While in the offline mode, the message store service accesses the local cache 404 to obtain copies of previously downloaded emails and provides these emails for viewing in the inbox of the email application 322, as also symbolically depicted by the arrow 412 of FIG. 4.

Ordinarily, a background process synchronizes the local cache 404 to match the original emails at the server 350 or updates the email information at the server 350 to match the contents of the local cache 404, whichever is more recent, whenever there is connectivity to the server 350. However, this synchronization operation is costly in terms of bytes consumed on a low bandwidth connection, as the operation synchronizes all of the email properties including attachments.

Therefore, one embodiment provides a client-side solution where the user explicitly chooses to download only specific attachments or other portions of emails on request while working with the email application 322 in a "Work Offline" state or other offline mode of CEM, or where the email application 322 is not even running. An embodiment also provides capability to download email portions (including attachments) while the email application 322 is running but without using the default mail retrieval mechanism (e.g., transport provider) of the email application 322. Furthermore, the client-side solution does not interfere with CEM operation while working "connected" in a high bandwidth environment (e.g., an embodiment can force or "trick" the email application 322 into remaining and operating in the offline CEM mode, where emails or portions thereof are accessed by the email application 322 from the local cache 404 rather than from the server 350, even though a connection has been established in the background through which emails can continue to be downloaded from the email server 350)—this feature prevents the email application 322 from performing its normal synchronization process during the online mode where new emails and all attachments are downloaded.

The block diagram 400 of FIG. 4 further shows an email add-in component 406, an email service component 408, and an email administration component 410. These components 406-410 can be embodied as software modules, sub-routines, or other code or machine-readable instruction, and can comprise part of the other programs/modules 324 shown in FIG. 3. In an embodiment, these components 406-410 can take the form of DLL functions that can be called by the email application 322 during execution. Any suitable control protocol can be used to manage communication between these various components 406-410, as depicted at 422 in FIG. 4.

The email add-in component 406 of one embodiment is used for presenting a user interface within the standard interface of the email application 322. For example, Microsoft Outlook 2003™ provides functionality that allows its standard interface (such as the inbox) to be modified with additional or different user interfaces and features. Therefore, an embodiment of the add-in component 406 provides a pull-down menu or other selection tool (described below with respect to FIG. 7) in the inbox of the email application 322 for presenting a user interface from which the user can select to download specific attachments. The add-in component 406 also operates to call the email service component 408 to process requests, such as requests to download a specifically selected attachment, download new email while in offline mode for display in the inbox, and other operations.

For downloading emails, the email service component 408 operates to control the download of emails or portions thereof from the server 350 while the email application 322 is in an offline mode or is not running, and also regardless of the power state of the portable computer 100. In such an embodiment, the default mail retrieval of the email application 322 is not invoked. Rather, the email service component 408 operates as the mail retrieval mechanism. In another embodiment, the email service component 408 operates to control the download of email from the server 350 while the email application 322 is in an online mode, but without using the default mail retrieval mechanism of the email application 322.

In an embodiment, the portable computer 100 can enter a standby power state wherein substantially most of the processing operations (and/or other operations) of the portable computer 100 are stopped or substantially reduced, for purposes of conserving power. The portable computer 100 may have other power states, including a full power state or other operating states. In one embodiment, the portable computer 100 can enter a standby power state to conserve power, and then periodically exit the standby power state and enable certain components (such as the email service component 408) to sufficiently power up and to check for the presence of a connection to the server 350 and download any new email from the server 350 while the connection is present. After the new emails are downloaded, the portable computer 100 can return to the standby power state.

In one embodiment, the email service component 408 communicates (through the messaging service of the email application 322) with the server 350 and partially downloads new email from the server 350 (such as by downloading at least a portion of a new email), as symbolically depicted by the arrow 414. The email service component 408 then places the partially downloaded email (e.g., without attachments, large email bodies, and/or embedded links) in the local cache 404, such as by placing the partially downloaded email in an .ost file. An arrow 416 in FIG. 4 symbolically depicts this caching operation. The email service component 408 can notify the email application 322 of the presence of new email in the local cache 404 through the control protocol at 422.

This downloading of email from the server 350 by an embodiment of the email service component 408 is a periodic background polling and caching of new email, when there is some network connectivity 342 or 344 to the server 350. The email service component 408 of such an embodiment is a background service that is always running, and then "wakes up" periodically for determining if there is one or more existing communication links to the server 350, establish a connection to the server 350 via one of the communication links, and then check (or poll) the server 350 for new email, regardless of whether the email application 322 is running and even when the second portion 104 (i.e., the lid) of the portable computer 100 is closed. That is, the email application 322 may be in an offline or online mode, or may not even be running. Yet, the background polling and caching still occurs independently of the state of the email application 322 and during any applicable power state of the portable computer 100.

Operation of a background polling and caching will now be described with regards to an email application 322 that operates only in an online mode. Such an email application 322 accesses and processes emails from the server 350 only when a connection is present, and does not access (or makes limited use of) the local cache 404, if present. In such an environment, local email storage capability of the local cache 404 is provided by the email service component 408. The email service component 408 populates the local cache 404 with emails (without attachments or other email portions) that it has downloaded from the server 350, and takes the place of the server 350 when the email application 322 is in its online mode. That is, when in the online mode, the email application 322 communicates directly with the email service component 408 to access email, as if the email service component 408 is the server 350, and does not independently access email from the server 350. Meanwhile in the background, the email service component 408 periodically polls the server 350 for new email and caches the new email or portion(s) thereof, and is also used for downloading attachments that have been selected by the user for viewing. In the context of FIG. 4, the arrow 412 depicts the communication between the content cached by the email service component 408 and the email application 322; the arrow 416 depicts caching and synchronization performed by the email service component 408; the arrow 414 depicts the background communication between the email service component 408 and the server 350; and the arrow 420 is not used, as the email application 322 does not directly communicate with the server 350.

As will be described later below, a synchronization engine 418 of the email service component 408 also performs synchronization while the email application is in an offline mode or is not running, thereby preventing the default transport provider of the email application 322 from performing its standard synchronization process. Synchronization can also be performed in another embodiment by the synchronization engine 418 when the email application 322 is in an online mode (but without using its default synchronization process/mechanism), and/or during any applicable power state of the portable computer 100. In this synchronization, the email service component 408 is used for updating the contents of the local cache 404 such that the contents of the local cache 404 matches the contents of the server 350. For example, the email service component 408 downloads new email, and places the downloaded email in the appropriate folders. If the user has moved downloaded emails into different folders, the email service component 408 is used for determining if an attachment is associated with the moved emails, and downloads the attachment to the correct folder, if a suitable high-speed connection to the server 350 is present. Such a synchronization process helps to prevent accidental deletion of attachments at the server 350 that would otherwise occur during a standard synchronization cycle (e.g., if an email has been downloaded without its attachment, the standard synchronization cycle would undesirably delete the attachment from the copy at the server 350 in order to mimic the downloaded email). This synchronization can also operate to download and complete email portions that were not previously downloaded, such as large message bodies or embedded content (links, graphics, and the like).

As another example, the user may have edited a downloaded email. An embodiment of the synchronization process ensures that the changes made by the users to the local copy of the email are propagated back to the copy at the server 350. As yet another example, an embodiment of the synchronization process helps to prevent duplicate emails from being present in the local cache. That is, the synchronization process updates any message IDs of locally cached emails to match the message IDs of their copies at the server 350. Otherwise, different message IDs may be present for identical emails, thereby resulting in the download of duplicative emails during a standard synchronization process.

The email administration component 410 of one embodiment is used for managing operation of the email service component 408. For instance, the email administration unit 410 can track whether the email service component 408 is active, deactivated, currently downloading emails or attachments, or other status information.

Figure 5:
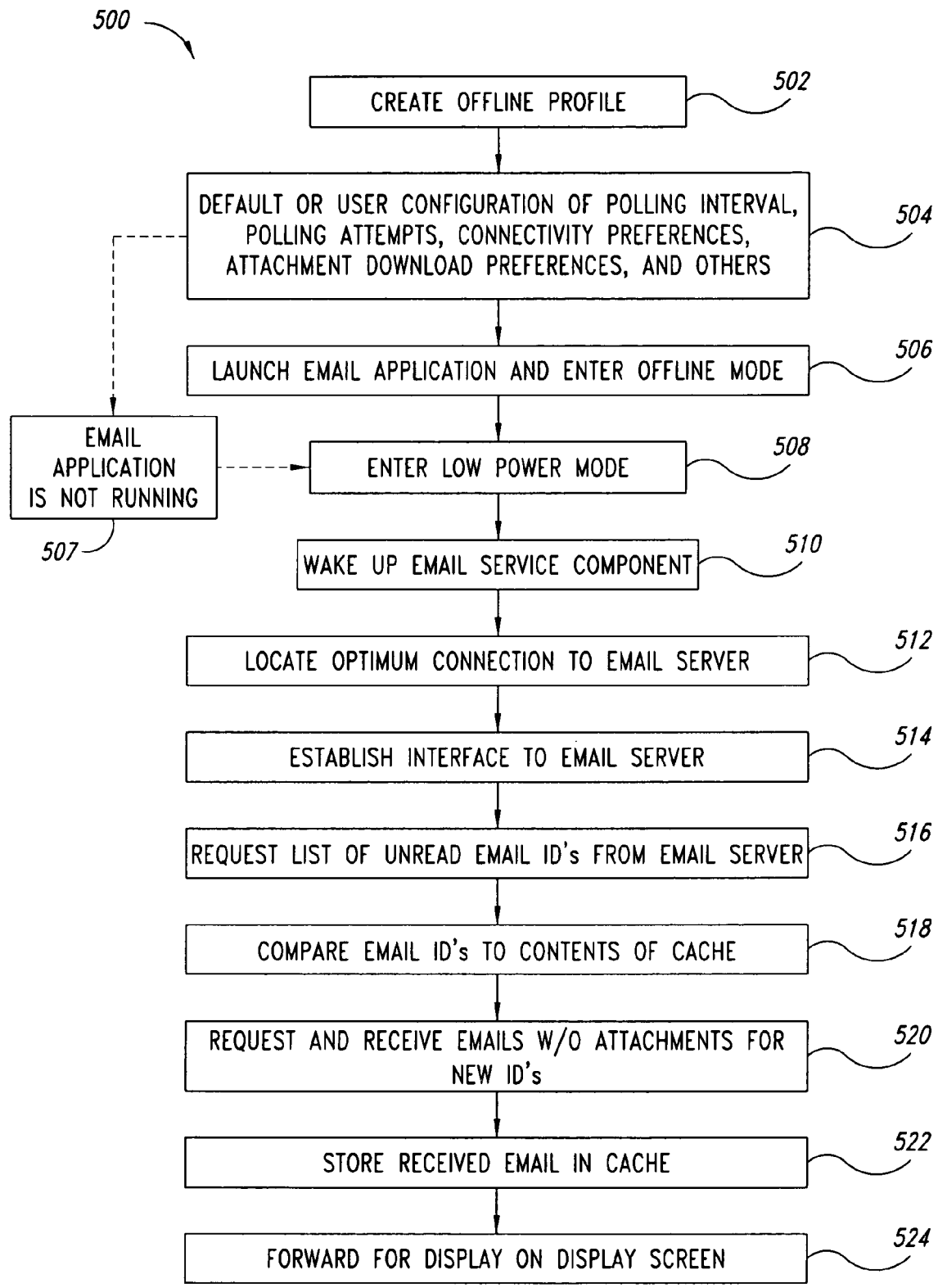
FIG. 5 is a flowchart of a technique for polling and caching email in accordance with one embodiment.

FIG. 5 is a flowchart 500 of a technique for polling and caching email in accordance with an embodiment. More specifically, the flowchart 500 illustrates an offline mode polling and caching that can be controlled by the email service component 408. Elements of the flowchart 500 (as well as other flowcharts depicted herein) can be embodied in software or other machine-readable instruction stored on a machine-readable medium. The operations of these various flowcharts need not necessarily occur in the exact order shown, and various operations can be combined, modified, removed, or added.

Beginning at a block 502, an offline profile is created. In the context of Microsoft Outlook 2003™ serving as the email application 322, the user can create various profiles having configuration information for the email application 322. According to one embodiment, one of the profiles that can be created is the offline profile, which specifies that the email application 322 should enter the CEM or offline mode (as opposed to the online mode) as default upon launching. Furthermore, the offline profile specifies that, during offline mode, the email service component 408 rather than the email application 322 controls the interface to the message store service of the messaging service. The offline profile can be embodied as a DLL function that is loaded when the email application 322 launches.

At a block 504, default or user configuration settings can be provided. As one example, settings can be made that specify the polling interval that the email service component 408 should use when checking the server 350 for new email, such as every 15 minutes, every hour, every two hours, etc. Moreover, the settings can include preferences for polling attempts, such as discontinuance of polling for five hours if three consecutive previous attempts to locate a connection to the server 350 fail (which may indicate that wireless service is not available in the area).

As another example, the settings at the block 504 can include connectivity preferences. For instance, the user can specify that Wi-Fi connections are never to be used, even if Wi-Fi service is available. The user may also specify a priority of one type of wireless connection over another type (e.g., Wi-Fi is preferred over Bluetooth, which is preferred over 802.11, etc.). The user can also specify conditions or settings when synchronization is to be performed by the synchronization engine 418 of the email service component 408, such when the email service component 408 of an embodiment is used for determining whether a high-speed connection having a bandwidth of at least X bits per second is available.

As yet another example, the settings at the block 504 can specify attachment download preferences. For instance, the user can specify that all attachments of a certain file type and size (such as media files) are not to be downloaded with emails, while smaller attachments (such as text files) can be downloaded with the email. The user can specify that all attachments, regardless of the file type and size, are not to be downloaded with the email. The user may also specify that email bodies exceeding X bytes in length are not to be downloaded (e.g., the subject field and message size information is to be displayed to the user, and then the user can determine whether to download the remainder of the email), and/or can specify that certain types or all types of embedded content are not to be downloaded. These are but a few configuration examples that can be specified at the block 504.

At a block 506, the email application 322 is launched, loads the offline profile, and uses the offline profile to enter the offline mode. By entering the offline mode, the email application 322 is prevented from automatically connecting to the server 350 to download email, and is instead forced to communicate with the local cache 404. Moreover by entering the offline mode, the standard synchronization cycle of the email application 322 is bypassed. In this embodiment as well as an embodiment where the email application 322 operates exclusively in an online mode at the block 506, the email service component 408 can independently perform the email retrieval with the server 350, as well as the synchronization, rather than the email application 322.

In another embodiment, the email application 322 need not be launched or otherwise be running in order to have the email service component 408 perform the downloading of emails without attachments. This implementation is depicted at a block 507. In such an embodiment, the email service component 408 operates independently in the background of the email application 322, thereby allowing the user to use other applications (such as a word processor, a spreadsheet, or even the email application 322) while the downloads are occurring.

At a block 508, the portable computer 100 enters a low power mode. In this low power mode, the operating system 320 is powered down, along with the high-power processing unit 304 and other components of the portable computer 100. A real-time clock and the email service component 408 are kept running, as well as the low-power processing unit 310 in one embodiment. The portable computer 100 generally has its lid closed as depicted in FIG. 2 during the low power mode. Alternatively or additionally at the block 508, the portable computer 100 may be in any other suitable power state, including a full-power state. In such a situation, the email service component 408 can perform the background polling and caching and synchronization independently of the mode or activation of the email application 322.

The email service component 408 is awakened at a block 510. In one embodiment, another service is tied to the real-time clock and wakes up at some time interval. That or another service also powers up a sufficient amount of the operating system 320 to allow the operating system 320 to perform some basic functions to support the email service component 408 to establish a connection with the server 350 and to download emails therefrom, and also awakens the email service component 408.

Once the email service component 408 is awakened, the email service component 408 communicates at a block 512 with another service that determines if there are any usable connections (generally wireless) to the server 350. That service can use any suitable technique to determine the availability of connections to the server 350, and once their availability is determined, that service can determine which of the available connections is optimum. In one embodiment, determining the optimum connection (e.g., highest bit rate, least expensive, lowest latency, least congestion, etc.) can be based on the configuration settings or other program data 326 provided at the block 504 and/or based on some type of logic after determination of transmission/reception conditions on each of the connections.

At a block 514, the email service component 408 establishes a communication interface with the server 350. In one embodiment, this involves having the email service component 408 establish a MAPI interface to the server 350 via the MAPI transport provider and the message store service of the messaging service of the email application 322.

An embodiment provides an optimization feature with regards to establishing a communication interface with the server at the block 350. That is, there may be several different communication layers that need to be traversed before a connection between the email service component 408 and the server 350 is established. Examples include, but are not limited to, TCP/IP, WAN, VPN, etc. communication layers. Each of these layers in turn may require their own authentication process or other negotiation process in order to establish a usable connection. The various authentication and/or negotiation processes through each of these layers can add to latency and can have adverse usage demands on battery power, especially if each of these processes need to be repeated at each polling stage. Accordingly, an embodiment attempts to keep persistent the communication link(s) through as many of these communication layers as possible. By keeping such links persistent, authentication or other negotiation processes for subsequent pollings need not be repeated.

Once communication with the server 350 is established on a selected one of the connections, the email service component 408 requests unread or new email identifiers (IDs) from the server 350 at a block 516. The IDs of the new/unread emails (which may comprise part of the email data 356 of FIG. 3) are returned as a list by the server 350 to the email service component 408 by way of the message store service. The returned list may also contain attachment information, such as the name of an attachment associated with a particular email, file type, attachment ID, file size, and other attachment properties that can comprise part of the email data 356.

At a block 518, the email service component compares the IDs on the list with IDs of previously downloaded emails that are stored in the local cache 404. If there are any received email IDs that do not correspond to emails stored in the local cache 404, then the email service component 408 requests and receives (downloads) emails 354 corresponding to such IDs from the server 350 at a block 520. In an embodiment, the downloaded emails 354 are received without attachments and/or embedded content (such as HTML links, graphics, and other pieces of content that can be embedded within a body of an email). When requesting download of emails 354, the email service 408 first determines if there is an attachment associated with a particular email, and if there is, requests download of only the email and not the associated attachment. The downloaded email thus includes only the header information (e.g., the data in the To, From, Subject, and date fields) and the body of the email.

At a block 522, the received (i.e., partially downloaded) emails are stored in the local cache 404 as they are received.

At a block 524, the emails in the local cache 404 are forwarded to the email application 322 to be displayed in the inbox rendered on the display screen 108, when the portable computer 100 is in the "open" position. Alternatively or additionally for embodiments of the portable computer 100 that include the rear display 338 on the lid (i.e., on the outside surface of the second portion 104), the email service component 408 forwards the stored email to the rear display 338 so that the email can be displayed on an inbox rendered on the rear display 338 while the lid is closed. In this manner, the user can readily see new emails in the inbox without having to open up the portable computer 100, and the inbox can be refreshed as emails are continually downloaded during the offline mode.

Figure 6:
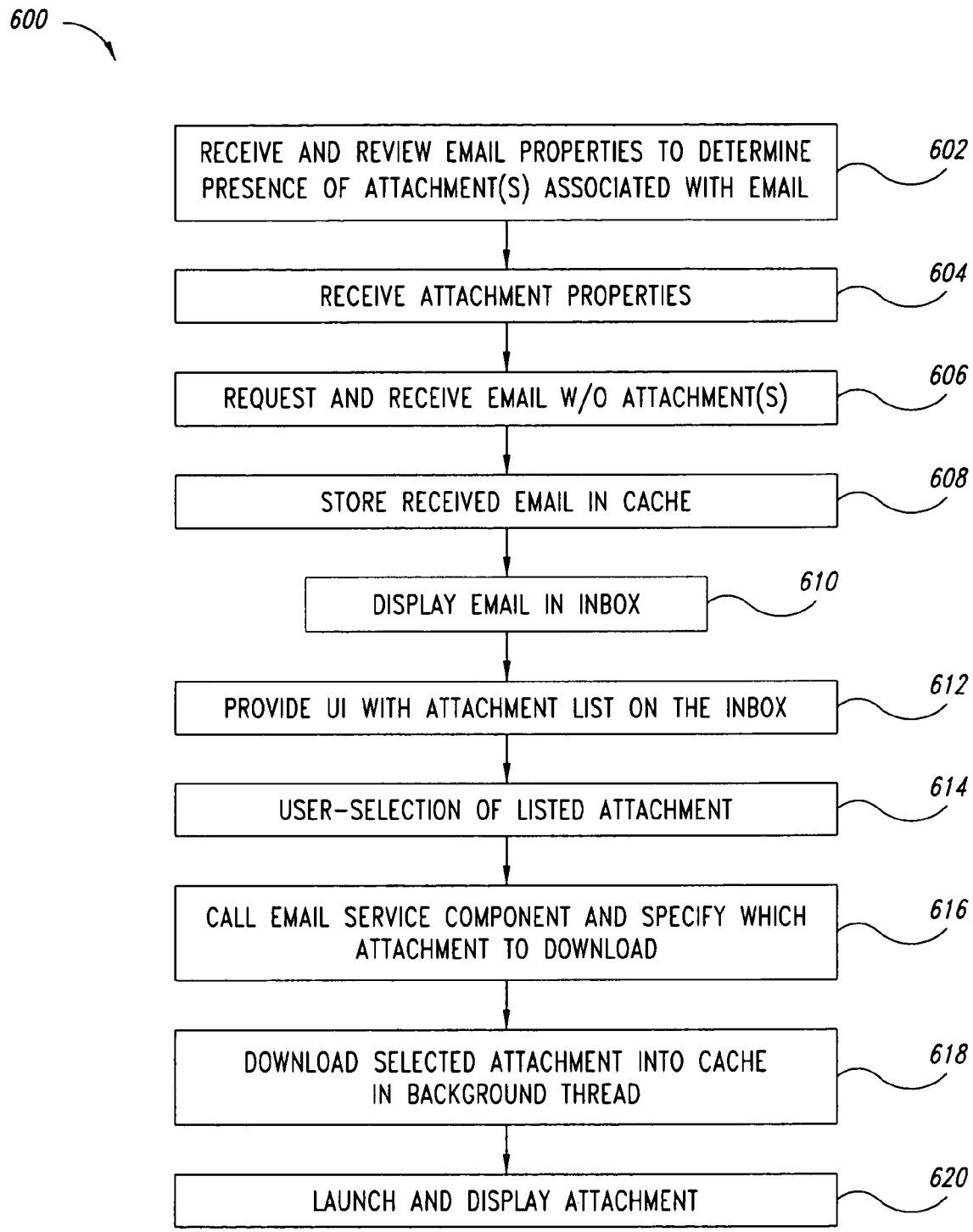
FIG. 6 is a flowchart of a technique for managing attachment downloads in accordance with one embodiment.

FIG. 6 is a flowchart 600 of a technique for managing attachment downloads in accordance with an embodiment. Some operations depicted in the flowchart 600, while indicated with different reference numerals, may be integrated with operations depicted in the flowchart 500 of FIG. 5, such as at the blocks 516, 520, 522, and 524. For purposes of simplicity of illustrations and explanation, management of attachment downloads will be described herein. The illustrations and explanations can be applied to management of the downloading of other email portions, such as embedded content, large email bodies, and the like.

At a block 602, the email service component 408 receives and reviews email properties that were sent from the server 350. The email properties indicate, among other things, whether there is an attachment or embedded link associated with the particular email. Thus, by checking the email properties at the block 602, the email service component 408 can determine whether there are one or more attachments associated with the email. At a block 604, the email service component 408 can receive specific attachment properties information from the server 350. These email properties can include, for instance, name of the attachment, file type, size, date created, and so forth. The operations at the blocks 602 and 604 may be performed in the block 516 of FIG. 5, or performed separately.

At a block 606, the email service component 408 requests and receives emails 354 without attachments and/or without other email portions from the server 350. These received emails 354 are stored in the local cache 404 at a block 608.

At a block 610, the emails in the local cache 404 are displayed in the inbox, which may be rendered on the rear display 338 if the lid of the portable computer 100 is closed, or displayed on the main display screen 108 if the lid is open. In an embodiment, the email add-in component 406 uses the previously received attachment properties information to provide a user interface with an attachment list on the inbox.

Figure 7:
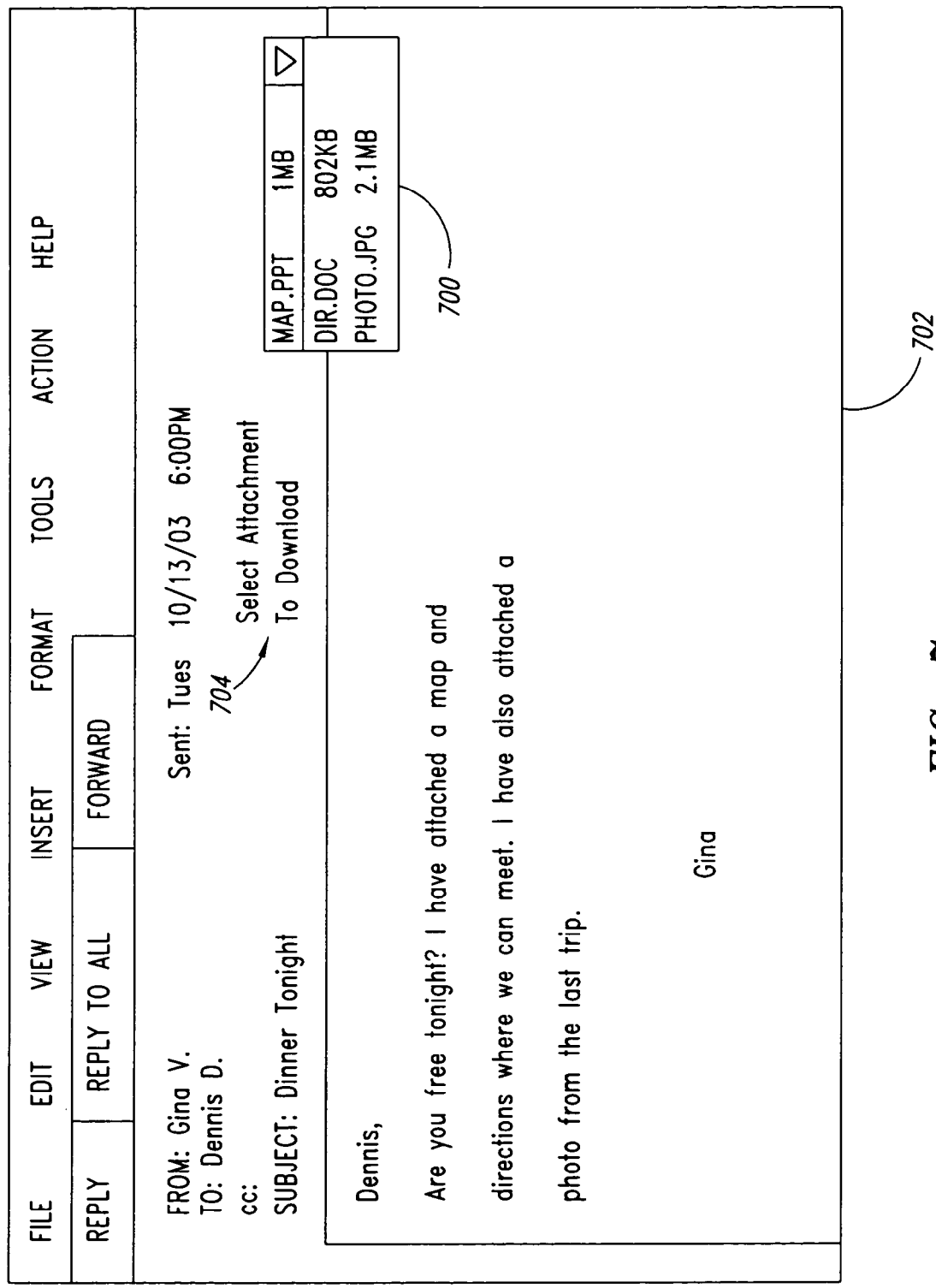
FIG. 7 is a diagrammatic representation of a user interface that can be used to select an attachment for downloading according to one embodiment.

FIG. 7 shows an embodiment of an example user interface 700 that can be used to display attachments and select an attachment for downloading. As depicted in FIG. 7, the user interface 700 displays the name, file type, and size of the attachment associated with the particular email 702 in the inbox, where this displayed attachment information may be obtained from the previously received attachment properties. The email add-in component 406 can provide the user interface 700 with a prompt 704 that prompts the user to select one of the listed attachments to download, if desired. The user can then select one of the listed attachments from the user interface 700 by clicking, highlighting, or other suitable selection technique.

In one embodiment, the selection via the user interface 700 is performed when the user is able to open the lid of the portable computer 100, and select an attachment via the user interface 700 that is now rendered on the inside display screen 108. Accordingly, the rear display 338 is used to inform the user of the presence of new email and possible associated attachments, and then the user can open the lid of the portable computer 100 to perform selection, via the user interface 700, of a specific attachment for download. Alternatively or additionally, the user interface 700 can be rendered on the rear display 338 to allow the user to select and read emails and attachments without having to open up the portable computer 100.

Returning now to FIG. 6, if the user selects one of the listed attachments at a block 614, then the email add-in component 406 calls the email service component 408 at a block 616. The email add-in component 406 specifies to the email service component 408 which attachment to download.

The email service component 408 downloads the selected attachment into the local cache 404 in a background thread relative to the email application 322 at a block 618. It is noted that during this download, the email application 322 is kept in offline mode, is not running, or is running online but is not able to retrieve email from the server 350, and thus does not make any connections to the server 350 or perform its own synchronization. The email service component 408 controls the download of the attachment, and performs the download in a background process independent of the email application 322 so that the user can continue to use other applications and does not have to wait for the attachment download to complete. At a block 620, the attachment is launched and displayed on the display screen 108 in response to user commands.

Figure 8:
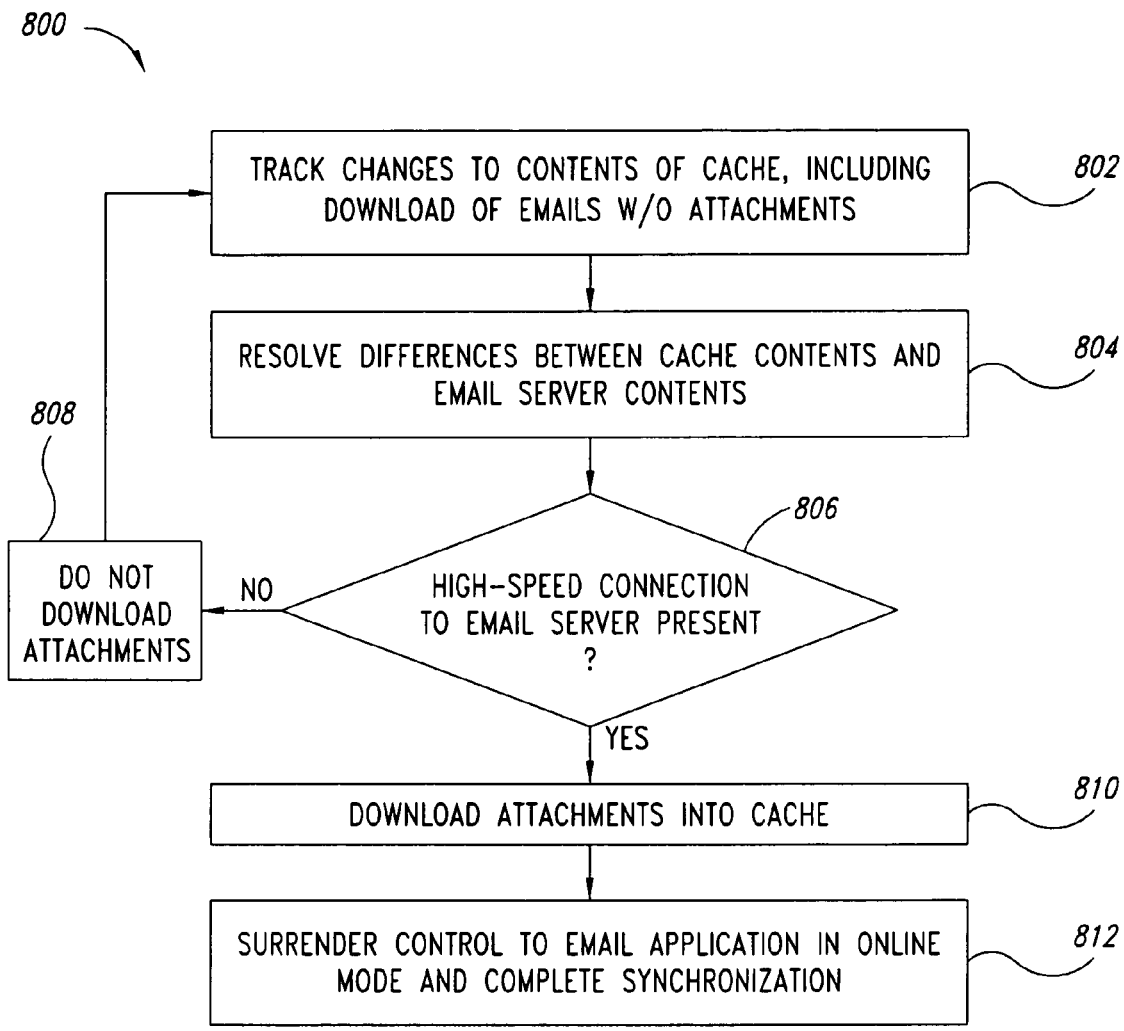
FIG. 8 is a flowchart of an embodiment of a technique for performing synchronization in an offline mode and independently of an email application.

FIG. 8 is a flowchart 800 of an embodiment of a technique for performing synchronization while the email application is in an offline mode or otherwise independently of the state of the email application 322. The synchronization may also be performed during any suitable operating state of the portable computer 100. As an overview, synchronization is a useful process because the data in the local cache 404 becomes inconsistent with the data in the server 350 while the user operates the email application 322 in the offline mode. For example, the user may move emails to various folders, edit emails, update calendar information, download emails without attachments, and perform other activities that create an unsynchronized situation. Thus, in one embodiment, the synchronization engine 418 or other component should identify that an email in the local cache 404 has moved to a new folder location and whether that email has an attachment associated with it, or whether any other changes have occurred. When synchronization is performed, such an embodiment will preferably ensure that the correct attachment is associated to the correct email in the correct folder, no duplicative emails are downloaded into the local cache 404, no emails or email portions are deleted from the server 350, or no other adverse chaotic situation occurs, for instance.

Synchronization is performed in one embodiment by the synchronization engine 418 of the email service component 408. This synchronization is performed while the email application 322 is in a state where its standard synchronization process is disabled and when a high-speed connection to the server 350 is available. Accordingly, at least several attachments can be efficiently downloaded and matched to their respective emails in a background process by the email service component 408 when a high-speed connection is available, and then control can be surrendered to the email application 322 when the email application 322 transitions to the online mode.

Beginning at a block 802 in FIG. 8, changes to the contents of the local cache 404 are tracked while the email application 322 is in the offline mode or is not running (and is thus prevented from performing its standard synchronization cycles). The email service component 408 may be used for tracking the changes, or the changes may be tracked by some other suitable component. In an embodiment, this tracking at the block 802 includes tracking which emails have been partially downloaded (e.g., have been downloaded without attachments, large email bodies, or embedded links) and folder locations where such emails may have been moved. The tracking can also include tracking the message IDs of the original emails, so that any changed message IDs can later be restored to the original message IDs, thereby preventing downloading of duplicative emails during a subsequent standard synchronization cycle.

At a block 804, the synchronization engine 418 of the email service 408 is used for resolving or otherwise comparing the differences between the contents of the local cache 404 and contents of the server 350. In an embodiment, this involves comparing the mirror inbox .ost file with the inbox in the server 350, and determining which folders or emails need synchronization to ensure that missing attachments are downloaded to the local cache 404. The operations at the block 804 can also include identifying which emails have been edited, moved to a new folder, etc., so that these changes can be propagated back to the server 350 during the synchronization cycle.

At a block 806, the synchronization engine 418 or other component is used for determining whether a high-speed connection to the server 350 is present. For example, there may be no wireless connections available at all, or the available wireless connections are too busy or have low bandwidth. As described above, one embodiment allows a default or user-specified setting to determine whether a connection is sufficiently high speed. In situations where there is not an acceptable connection present (whether wireless or hardwire), the attachments are not downloaded as depicted in the block 808, and the process returns to the block 802 to track changes. It is noted that in situations where a connection is available but may not have sufficient capacity for synchronization, such a connection may nevertheless still be used to download emails 354 without attachments and "lightweight" email data 356, such as email properties and attachment properties.

If a high-speed connection is detected at the block 806, then the attachments are downloaded into the local cache 404 at a block 810. As many attachments as possible are downloaded into the local cache 404 while the email application 322 is offline and while the high-speed connection is present. It is possible for all attachments to be downloaded in this time period, and it is also possible for only some of the attachments to be downloaded before the high-speed connection becomes unavailable or the email application 322 is switched to the online mode. The remaining synchronization can be completed when a subsequent acceptable connection to the server 350 is identified.

At a block 812, the email service component 408 surrenders control to the email application 322, such as when all or most of the previously downloaded emails have been synchronized, and the email application 322 can be allowed to enter the online mode. Once in the online mode, the standard synchronization cycle of the email application 322 is performed. However, since some synchronization download of attachments (and other updates) have already been performed without using the default synchronization cycle of the email application 322, the standard online synchronization cycle will not result in duplicative email downloads, accidental deletion of attachments, and so forth.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while some embodiments have been described in the context of Microsoft Outlook 2003™ as the operative email application 322, the invention is not limited to this specific email application. Other embodiments may be implemented to operate with email applications that are different from Microsoft Outlook 2003™.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable for an electronic device having an email application, the method comprising:
   at time intervals, determining if at least one connection to a server is present, and if at least one connection is determined to be present, polling the server to determine if new email is available for download;
   downloading at least a portion of at least one new email to the electronic device via the at least one connection, if present, without using at least a portion of a default email retrieval mechanism of the email application for said downloading, said downloading being performed in a background process in which said email application does not connect to said server, including if said email application is in an inoperative mode in which said email application is not running; and
   locally storing the downloaded portion of the email.

2. The method of claim 1, farther comprising allowing the email application to access the locally stored portion of the email instead of having the email application communicate with the server to access the email.

3. The method of claim 1 wherein said downloading performed in said background process further includes downloading while the email application is in an offline mode, or in an online mode, without using at least the portion of the default email retrieval mechanism of the email application.

4. The method of claim 1 wherein downloading at least the portion of the email to the electronic device without using at least the portion of the default email retrieval mechanism of the email application includes:
   downloading at least the portion of the email to a memory while the email application is in an online mode, without using the portion of the default email retrieval mechanism of the email application for this download; and
   causing the mail retrieval mechanism of the email application to access the downloaded portion of the email from the memory instead of using a default online behavior of the mail retrieval mechanism to access the email from the server.

5. The method of claim 1 wherein downloading at least the portion of the email includes downloading while the electronic device is in an operating power state, including a standby power state from which the electronic device can exit to enter another power state to download the portion of the email.

6. The method of claim 1 wherein downloading at least the portion of the email to the electronic device includes downloading to a portable electronic device.

7. The method of claim 1 wherein the at least one new email includes at least one of an attachment, embedded content, and a portion of an email body, each of which is excluded from at least the portion of the at least one new email that is downloaded.

8. The method of claim 1, further comprising:
entering a low power state of the electronic device;
maintaining a real-time clock in the electronic device while in the low power state;
using the real-time clock to determine the time intervals;
at the time intervals, activating at least one component of the electronic device to search for a connection to the server and to poll the server for new email.

9. The method of claim 1 wherein said electronic device has a lid that has a display screen located on an inside surface of said lid and at least one display screen located on an outside surface of said lid, the method further comprising displaying an indication of the downloaded email in an inbox on said at least one display screen on the outside surface of said lid and while said lid is closed to cover said display screen on the inside surface of said lid.

10. The method of claim 1, further comprising if multiple connections to the server are determined to be present, determining which of the present connections is optimum for downloading at least the portion of the new email.

11. The method of claim 1 wherein polling includes:
downloading email identifiers from the server;
comparing the downloaded email identifiers with previously downloaded identifiers to determine which emails associated to the downloaded identifiers are new emails; and wherein downloading at least the portion of at least one new email includes:
downloading emails corresponding to the downloaded identifiers that are determined to be associated with new emails.

12. The method of claim 1, further comprising using configuration settings to determine either or both the time intervals and a number of polling attempts.

13. The method of claim 1, further comprising reducing latency associated with each polling attempt by maintaining persistent at least one communication link from a prior polling attempt.

14. A method usable for an electronic device having an email application, the method comprising:
at time intervals independent of an operating mode of the email application, determining if at least one connection to a server is present, and if at least one connection is determined to be present, polling the server to determine if new email is available for download;
downloading via the connection at least a portion of at least one new email to the electronic device in a background process independent of the operating mode of the email application in which said email application does not connect to said server, including downloading said at least the portion of the email if said email application is in an inoperative mode in which said email application is not running; and
storing the downloaded portion of the email.

15. The method of claim 14, further comprising allowing the email application to access the stored downloaded email alternatively to accessing the server for the email.

16. The method of claim 14 wherein polling includes:
downloading email identifier information prior to downloading any corresponding email; and
comparing the downloaded email identifier information with locally stored email identifier information to determine if the corresponding email is new.

17. The method of claim 14, further comprising:
displaying a first indication of at least the portion of the downloaded email in a first display screen on a first surface of a lid of the electronic device while the electronic device is in a low power state; and
displaying a second indication of at least the portion of the downloaded email in a second display screen on a second surface of the lid of the electronic device while in the electronic device is in a high power state, said first surface being on an opposite side of said lid relative to said second surface such that the first indication is displayed in the first display screen on the first surface while the lid is closed to cover the second display screen.

18. An article of manufacture for an electronic device having an email application, the article of manufacture comprising:
a machine-readable medium having instructions stored thereon to cause a processor to manage email downloads by:
at time intervals while the email application is set in a mode that includes an inoperative mode, searching for a connection to a server, and if the wireless connection is found, polling the server to determine if new email is available for download;
downloading at least a portion of at least one new email to the electronic device, said downloading being performed in a background process in which said email application does not connect to said server, including if said email application is in said inoperative mode in which said email application is not running; and
storing the downloaded portion of new email.

19. The article of manufacture of claim 18 wherein the machine-readable medium further includes instructions stored thereon to cause the processor to manage email downloads, by:
setting the email application to said mode that includes said inoperative mode, wherein a portion of its email retrieval mechanism that retrieves email from the server is substantially prevented from being invoked; and
causing the email application to access the stored downloaded portion of the new email alternatively to retrieving the email from the server.

20. The article of manufacture of claim 18 wherein the instructions to download at least the portion of the new email includes instructions to partially download the new email with at least one associated attachment excluded.

21. The article of manufacture of claim 18 wherein the machine-readable medium further includes instructions stored thereon to cause the processor to manage email downloads by invoking at least a portion of the email retrieval mechanism of the email application while the email application is in an online mode to access the downloaded portion of the new email instead of accessing the server.

22. The article of manufacture of claim 18 wherein the machine-readable medium further includes instructions stored thereon to cause the processor to manage email downloads by activating at least one component from a low power state at the time intervals to search for the wireless connection to the server and to poll the server for new email.

23. The article of manufacture of claim 18 wherein the machine-readable medium further includes instructions stored thereon to cause the processor to manage email downloads by determining which of a plurality of wireless connections is optimum for downloading at least the portion of the new email.

24. The article of manufacture of claim 18 wherein the instructions to poll includes instructions to:
request email properties information from the server;
compare the email properties information with previously received email properties information to determine if the requested email properties information corresponds to new emails; and
request at least portions of emails from the server that are associated with the email properties information that is determined to correspond to new emails.

25. The article of manufacture of claim 18 wherein the machine-readable medium further includes instructions stored thereon to cause the processor to manage email downloads by downloading new email if the electronic device is in any operative power state, including a low power mode of said electronic device.

26. The article of manufacture of claim 18 wherein the instructions to download at least the portion of the new email include instructions to download only data from a header of the new email and not download a message body.

27. The article of manufacture of claim 18 wherein the machine-readable medium further includes instructions stored thereon to cause the processor to manage email downloads by discontinuing polling the server for new email for a period of time if multiple consecutive attempts to reach the server fail.

28. A system for an electronic device having an email application, the system comprising:
a means for determining, at time intervals independent of an operating mode of the email application, if at least one connection to a server is present, and for polling the server to determine if new email is available for download if at least one connection to the server is determined to be present;
a means for downloading at least a portion of a new email to the electronic device via the connection independent of the operating mode of the email application, said means for downloading performing a download of said portion of the new email in a background process in which said email application is unconnected to said server; and
a means for storing the downloaded portion of the email.

29. The system of claim 28, further comprising a means for controlling the email application to access the stored downloaded portion of the email alternatively of accessing the email from the server.

30. The system of claim 28 wherein said electronic device has a lid that has a display screen located on an inside surface of said lid, the system further comprising:
at least one display means, located on an outside surface of said lid opposite from said inside surface, for displaying an inbox, while said lid is closed to cover said display screen on the inside surface of said lid, that can show indications of new emails that have been continually downloaded independently of the operating mode of the email application;
a means for communicating between the electronic device and the server; and
means for processing downloading of emails and attachments.

31. The system of claim 28, further comprising a means for maintaining the email application in an operating mode wherein its mail retrieval mechanism is substantially prevented from retrieving email from the server, said operating mode including a mode wherein said email application is not running in which said means of downloading can perform said download of said portion of the new email.

32. The system of claim 28, further comprising a means for managing the means for downloading the new email while the email application is in an offline operating mode.

33. An apparatus having an email application, the apparatus comprising:
a first component that can be activated at time intervals to poll a server for new email, the first component being further capable to continually download at least a portion of at least one new email from the server while the email application is in an operating mode wherein the email application is precluded from retrieving email from the server, if the poll determines that the new email is available for download; and
a second component to present an inbox to display an indication of at least the portion of the new email that is downloaded by the first component.

34. The apparatus of claim 33, further comprising:
a lid having an inside surface and having an outside surface that is located on an opposite side of said lid relative to said inside surface;
a first display screen located on said inside surface; and
a second display screen located on said outside surface, wherein said inbox can be presented by said second component on said second display screen while said lid is closed to cover said first display screen, and
wherein the second component can further refresh the inbox as at least portions of new emails are continually downloaded by the first component.

35. The apparatus of claim 33, further comprising a memory to store the downloaded portion of the new email, and which can be accessed by the email application alternatively to accessing of the server.

36. The apparatus of claim 33 wherein the first and second components comprise dynamic link library components that can be called during operation of the email application.

37. The apparatus of claim 33, further comprising at least one of polling settings to indicate either one or both length of the time interval and number of unsuccessful polling attempts before discontinuance of the polling, and connectivity settings that specify communication connection conditions under which new email is to be downloaded.

38. The apparatus of claim 33 wherein the first component can further determine if at least one connection to the server is available and to select an optimum available connection through which to download at least the portion of the new email.

39. The apparatus of claim 33 wherein the first component can determine if an email to download is new based on a comparison of an identifier of that email with previously downloaded identifiers.

40. The apparatus of claim 33, further comprising a third component to manage the first component.

41. The apparatus of claim 33 wherein the first component can download at least the portion of the new email in a background thread relative to the email application, including if said email application is not running.

* * * * *

UNITED STATES PATENT AND TRADEMARK OFFICE
CERTIFICATE OF CORRECTION

PATENT NO. : 7,290,034 B2 Page 1 of 1
APPLICATION NO. : 10/841229
DATED : October 30, 2007
INVENTOR(S) : Budd et al.

It is certified that error appears in the above-identified patent and that said Letters Patent is hereby corrected as shown below:

In column 4, lines 28-31, delete "Therefore, the invention is not to be limited to a particular type or size of electronic device. For purposes of simplicity, a portable computer will be used throughout this description to explain the operation of various embodiments." and insert the same on Col. 4, Line 27 (Approx.), after "environment.", as a continuation of the same paragraph.

In column 5, line 14, after "thereof" insert -- ) --.

In column 10, line 7, delete "NoteS" and insert -- Notes --, therefor.

In column 20, line 47, in Claim 2, delete "farther" and insert -- further --, therefor.

In column 22, line 22, in Claim 17, before "the" delete "in".

Signed and Sealed this

Twenty-fourth Day of June, 2008

JON W. DUDAS
*Director of the United States Patent and Trademark Office*